Nov. 2, 1954
C. A. BRUCHLOS
2,693,164
ANTITHEFT WALLET ALARM
Filed July 23, 1953
2 Sheets-Sheet 1
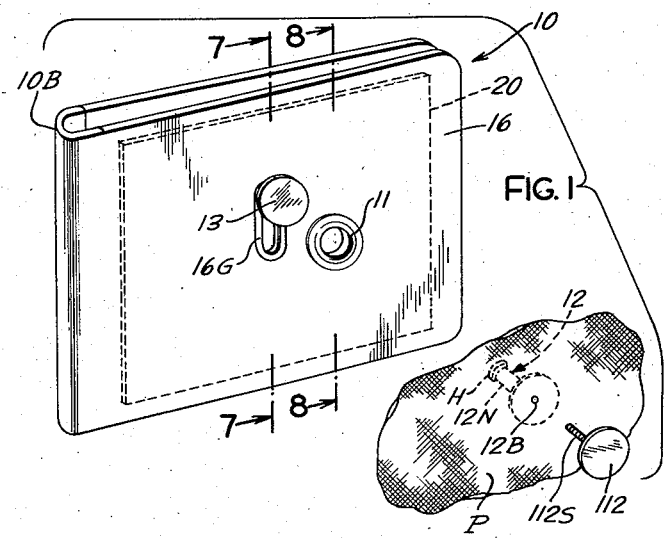
FIG. 1
FIG. 3
FIG. 3A
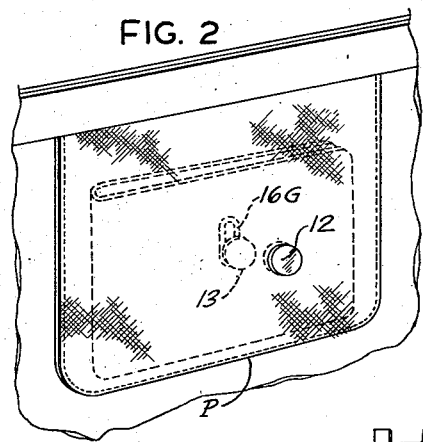
FIG. 2
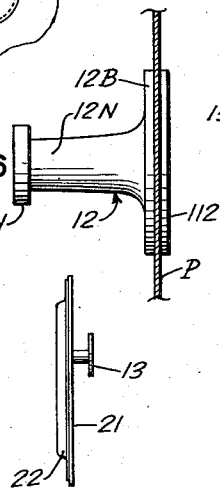
FIG. 6
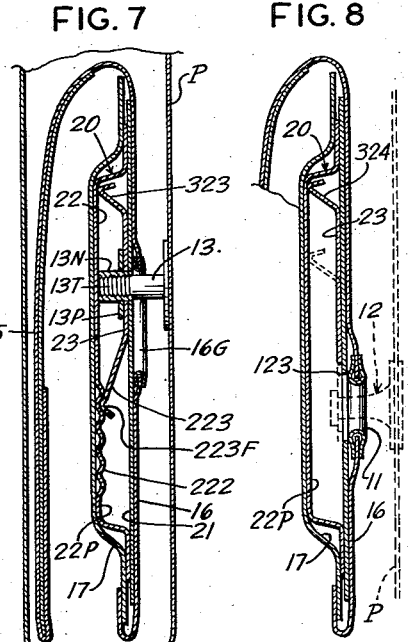
FIG. 7 FIG. 8
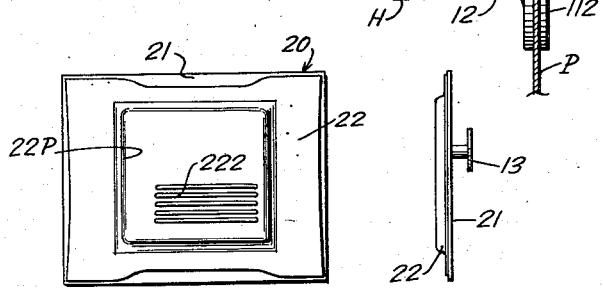
FIG. 4 FIG. 5
INVENTOR.
CHARLES A. BRUCHLOS
BY *Fred Ring*
ATTORNEY Nov. 2, 1954  C. A. BRUCHLOS  2,693,164
ANTITHEFT WALLET ALARM
Filed July 23, 1953  2 Sheets-Sheet 2

INVENTOR.
CHARLES A. BRUCHLOS
BY
ATTORNEY

United States Patent Office 2,693,164
Patented Nov. 2, 1954

2,693,164

ANTITHEFT WALLET ALARM

Charles A. Bruchlos, Chicago, Ill.

Application July 23, 1953, Serial No. 369,916

6 Claims. (Cl. 116—84)

This invention relates to wallet constructions, and particularly to such constructions embodying anti-theft means.

While many anti-theft devices have been proposed for association with wallets, pocketbooks and the like, most of these anti-theft devices have been in the nature of relatively bulky mechanisms associated in some instances with the wallet itself, but in most instances with the pocket or clothing of the uesr. Such prior devices have been found to be unsatisfactory, and in view of this, it is the primary object of the present invention to afford an anti-theft wallet construction that is extremely compact, effective and economical, and objects related to the foregoing are to embody such an anti-theft device wherein the primary elements of the anti-theft mechanism are embodied within the wallet in such a manner that undue bulk in the wallet is avoided, and to afford such an anti-theft construction wherein an audible alarm mechanism is incorporated in such anti-theft mechanism.

More specifically, it is an object of the present invention to afford an anti-theft mechanism that is relatively flat in character so that it may be incorporated in a wallet without appreciably increasing the overall thickness of the wallet, and to embody such anti-theft mechanism in such a way that the frame elements of the anti-theft mechanism serve as a noise making sound board for producing an audible alarm when the wallet locking mechanism is operated.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

Fig. 1 is a schematic perspective view illustrating a wallet structure embodying the features of the invention;

Fig. 2 is a perspective view somewhat similar to Fig. 1 and illustrating the wallet with the locking parts in their associated and locked relationship;

Fig. 3 is a face view of a wallet showing internal parts of the locking mechanism in dotted outline and in released position;

Fig. 3A is a view similar to Fig. 3 and showing the parts of the locking mechanism in their locked relationship;

Fig. 4 is a cutaway view showing the outside face of the rear plate of the locking unit;

Fig. 5 is a side or end elevational view of the locking or anti-theft unit;

Fig. 6 is a side elevational view of the anchoring stud;

Figure 9:
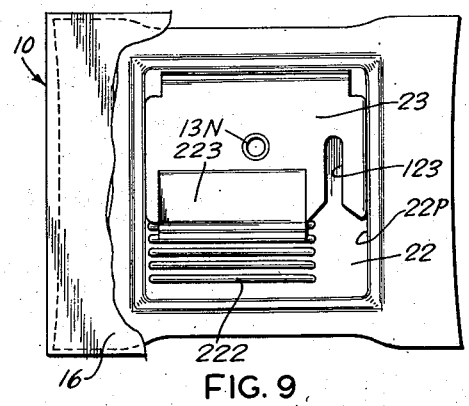
Figure 10:
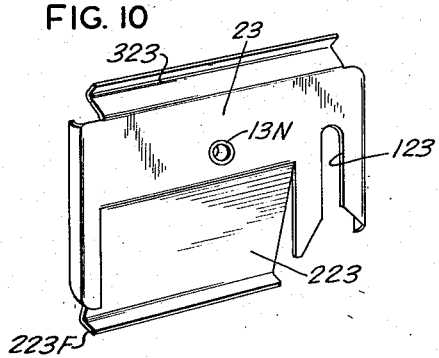
Figure 13:
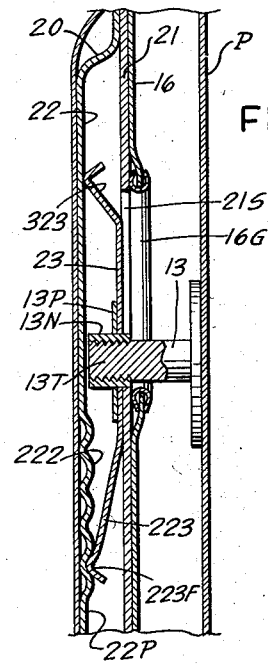
Figure 14:
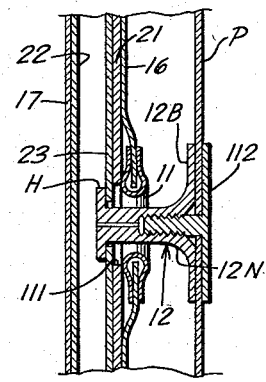
Figure 12:
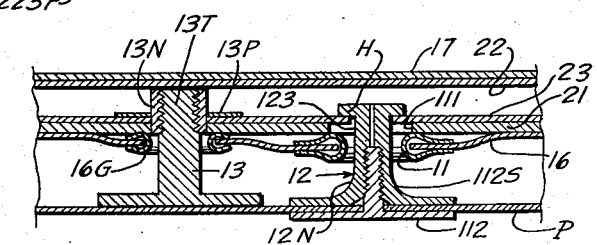
Figure 11:
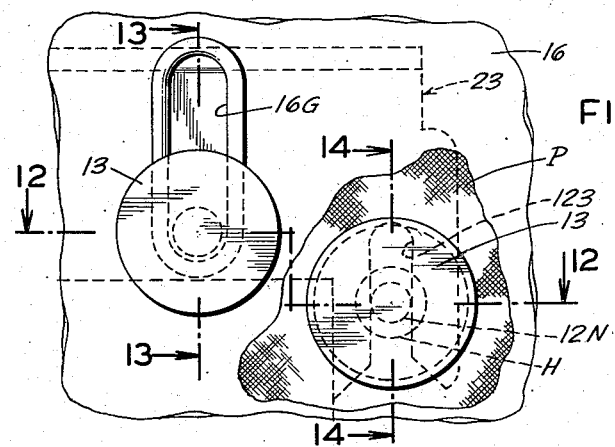

Figs. 7 and 8 are vertical and sectional views taken substantially along the lines 7—7 and 8—8 of Fig. 1;

Fig. 9 is an inside view of the rear plate and locking slide;

Fig. 10 is a perspective view of the locking slide;

Fig. 11 is an enlarged fragmentary portion of Fig. 3A showing the anchoring stud in position; and Figs. 12, 13 and 14 are cross sectional views taken substantially along the lines 12—12, 13—13 and 14—14 of Fig. 11.

For purposes of disclosure, the invention is herein illustrated as embodied in a wallet 10 having a locking recess or opening 11 therein that is adapted to receive a headed anchoring element 12 that is mounted in and on the material of the pocket P of a user, and to be locked to said anchoring element 12 by operation of a shiftable locking handle 13. The particular position of the wallet 10 or of the anchoring stud or element 12 in the pocket P is immaterial so long as the element 12 may be aligned with and inserted into the opening 11. The wallet 10 is made from a flexible sheet material such as leather or plastic to afford an elongated body having inner and outer walls 15 and 16 joined along their end and bottom edges to afford an upper open edge or upwardly opening compartment into which money in the form of bills may be introduced in a flat form. The wallet 10, as herein shown, is made from plastic, and the joining of the various walls is accomplished by means of heat-sealing. The wallet 10, of course, may have other pockets formed on the inner wall thereof according to conventional practice, and in use the wallet is usually folded midway between its ends as indicated at 10B in Fig. 1 of the drawings. Within the money or bill receiving pocket, above described, an inside liner wall 17 is preferably provided which is sealed at its lower edge between the inner and outer walls 15 and 16, and after completion of the wallet and mounting of the anti-theft mechanism therein, as will hereinafter be described, the upper edges of the liner wall 17 and the outer wall 16 are sealed or otherwise joined together.

The space between the liner wall 17 and the outer wall 16 and between one end and the central bend line 10B is utilized to afford a mounting and housing space for an anti-theft unit 20 which is made primarily from sheet metal and is relatively thin and flat in its form. Thus the anti-theft unit 20 has a front or outside plate 21 that is flat, and an inside or rear plate 22 that is of substantially the same size and which has a depressed rectangular panel 22P formed therein to afford a shallow chamber between the plates 20 and 21, as will be evident in Figs. 7, 8 and 12 to 14. The two plates 21 and 22 are joined as by welding about the marginal edges thereof, and within the chamber that is afforded between these two plates a sheet metal locking slide 23 is mounted for up and down movement between a released position that is shown in Fig. 7 of the drawings and a locked position that is shown in Fig. 8 of the drawings. The length of the slide 23 is such that the ends thereof slidably engage the side edges of the housing space, and thus the slide is properly guided in its moveemnts. These movements of the slide 23 are attained by means of the operating handle or stud 13 which, as shown in Figs. 7, 10 and 13, has a reduced threaded portion 13T that extends through the plate 21 and into an internally threaded nut 13N that is secured to the locking slide 23 by means such as a welded anchoring plate 13P. The operating stud 13, in the finished wallet, extends outwardly through a slot 21S and through a complemental opening in the outer wall 16 of the wallet, such opening preferably being defined by an elongated metal grommet 16G. Thus, the locking slide 23 may be moved between its locking and releasing positions and, when this is done, a locking slot 123 formed in the locking plate is moved into and out of position with respect to a clearance opening 111 that is formed in the plate 21 opposite the opening 11. In this connection, it should be observed that the opening 11 is preferably defined by a grommet, as shown in Figs. 12 and 14.

The headed anchoring stud 12 is formed in two parts, as shown in Figs. 12 and 14, the main part having a neck 12N with a head H formed thereon at the end thereof, and a base 12B has a screw threaded bore formed axially therethrough to receive a threaded stem 112S that is fixed on a base plate 112, as shown in Fig. 14. This threaded stem 112S is passed through the material of one wall of the user's pocket P, and the main portion of the anchoring stud is screwed tightly onto the threaded stem 112S thus to fix the anchoring stud 12 in position in the user's pocket. Then when the user places the wallet 10 in the pocket P, the locking slide 23 is located in its released position of Fig. 3 and the head H of the stud 12 is caused to enter the opening 11. Then the locking member 13 is shifted to the position shown in Figs. 2 and 3A so as to move the locking slide 23 and cause the slot 121 to embrace the neck of the locking stud 12 adjacent to the head H. This locks the wallet 10 in position in the user's pocket.

Under and in accordance with the present invention, means are afforded for restraining the locking slide 23 against undesired displacement from its locked position, and such means under the present invention are arranged to afford a warning noise or signal when the locking slide 23 is moved. Thus, as will be evident in Figs. 7, 8, 9 and 13, the locking slide 23 has a ratchet arm 223 formed thereon so as to afford a foot portion 223F that rides against the adjacent face of the rear plate 22. The portion of the rear plate 22 that is thus engaged by the foot 223F is, in turn, formed with a plurality of corregations 222 extending transversely with respect to the path of movement of the slide 23. The slide 23 has a guide flange 323 along its upper edge that rides on the adjacent face of the rear plate 22 that is thus engaged by the foot 223F is, in turn, formed with a plurality of corregations 222 extending transversely with respect to the path of movement of the slide 23. The slide 23 has a guide flange 323 along its upper edge that rides on the adjacent face of the plate 22; when the plates 21 and 22 are secured together the arm 223 is placed under spring tension. The ratchet arm 223 is resilient in character, due to the fact that the slide 23 is formed from a thin and relatively springy sheet metal, and thus when the locking slide 23 is moved, the ratchet arm 223 rides successively across the corregations 222 and produces a relatively sharp vibratory sound. The character of the plate 22 and the character of the plate 21 are such that these elements, in effect, serve as sounding board means to amplify the vibratory sound that is thus produced, and hence an effective warning signal is afforded as an incident to the the provision of a restraining means for the locking slide 23.

From the foregoing description, it will be apparent that the present invention affords an improved anti-theft wallet construction that is economical in character and which is compact in size and effective in operation. Moreover, it will be evident that the present invention, while affording an anti-theft device that is compact in character, also affords an audible alarm mechanism that is effective in character.

Thus, while I have illustrated and described the preferred embodiment of my invention, it is to be understood that this is capable of variation and modification.

I claim:

1. In an anti-theft wallet construction, a wallet having inner and outer walls, a flat hollow metal housing comprising an inner and outer plate and fixed inside said wallet with said outer plate against the inner surface of said outer wall, said outer plate and said outer wall having aligned openings therein through which a headed anchoring pin fixed in the pocket of a user may be projected into the hollow metal housing, a shiftable locking slide mounted within said housing and shiftable between locking and releasing positions with respect to such a headed anchoring pin, and operating means extended through one of said plates and one of said walls for shifting said locking slide between locking and releasing positions.

2. In an anit-theft wallet construction, a wallet having inner and outer walls, a flat hollow metal housing comprising an inner and outer plate and fixed inside said wallet with said outer plate against the inner surface of said outer wall, said outer plate and said outer wall having aligned openings therein through which a headed anchoring pin fixed in the pocket of a user may be projected into the hollow metal housing, a shiftable locking slide mounted within said housing and shiftable between locking and releasing positions with respect to such a headed anchoring pin, spring ratchet means acting between said slide and one of said plates for restraining said slide against undesired displacement, and operating means extended through one of said plates and one of said walls for shifting said locking slide between locking and releasing positions.

3. In an anti-theft wallet construction, a wallet having inner and outer walls, a flat hollow metal housing comprising an inner and outer plate and fixed inside said wallet with said outer plate against the inner surface of said outer walls, said outer plate and said outer wall having aligned openings therein through which a headed anchoring pin fixed in the pocket of a user may be projected into the hollow metal housing, a shiftable locking slide mounted within said housing and shiftable between locking and releasing positions with respect to such a headed anchoring pin, a spring ratchet arm on said slide engaging one of said plates, and serrations in said one of said plates engaged by said ratchet arm to produce an audible warning signal when said slide is moved and effective at other times to restrain said slide against undesired displacement, and operating means extended through one of said plates and one of said walls for shifting said locking slide between locking and releasing positions.

4. In an anti-theft wallet construction, a wallet having inner and outer walls, a flat hollow metal housing comprising an inner and outer plate and fixed inside said wallet with said outer plate against the inner surface of said outer wall, said outer plate and said outer wall having aligned openings therein through which a headed anchoring pin fixed in the pocket of a user may be projected into the hollow metal housing, a shiftable locking slide made from resilient sheet metal and mounted within said housing and shiftable between locking and releasing positions with respect to such a headed anchoring pin, a spring ratchet arm formed from the metal of said slide and yieldingly engaging one of said plates, and serrations in said one of said plates engaged by said ratchet arm to produce an audible warning signal when said slide is moved and effective at other times to restrain said slide against undesired displacement, and operating means extended through one of said plates and one of said walls for shifting said locking slide between locking and releasing positions.

5. In an anti-theft wallet construction, a wallet having inner and outer walls, a flat hollow metal housing comprising an inner and outer plate and fixed inside said wallet with said outer plate against the inner surface of said outer wall, said outer plate and said outer wall having aligned openings therein through which a headed anchoring pin fixed in the pocket of a user may be projected into the hollow metal housing, a shiftable locking slide mounted within said housing and shiftable between locking and releasing positions with respect to such a headed anchoring pin, yielding retaining means made from metal and carried on said slide engaging one of said plates, and serrations in said one of said plates engaged by said retaining means to produce an audible warning signal when said slide is moved and effective at other times to restrain said slide against undesired displacement, and operating means extended through one of said plates and one of said walls for shifting said locking slide between locking and releasing positions.

6. In an anti-theft wall construction, a wallet having inner and outer walls, a flat hollow metal housing comprising an inner and outer plate and fixed inside said wallet with said outer plate against the inner surface of said outer wall, said outer plate being disposed in parallel closely spaced relation and said outer wall having aligned openings therein through which a headed anchoring pin fixed in the pocket of a user may be projected into the hollow metal housing, a shiftable locking slide mounted within said housing and shiftable between locking and releasing positions with respect to such a headed anchoring pin, noise making means disposed between said plates and operable as an incident to shifting movement of said slide, and operating means extended through one of said plates and one of said walls for shifting said locking slide between locking and releasing positions.

No references cited.